(12) United States Patent
Zawodniok et al.

(10) Patent No.: US 11,375,430 B2
(45) Date of Patent: *Jun. 28, 2022

(54) MULTI-PATH WIRELESS MESH NETWORKS

(71) Applicant: SitePro, Inc., Lubbock, TX (US)

(72) Inventors: Maciej Zawodniok, Lubbock, TX (US); Ivan G. Guardiola, Lubbock, TX (US); David Bateman, Lubbock, TX (US); Aaron Phillips, Lubbock, TX (US); Arul Mathi Maran, Lubbock, TX (US); Nathan Daniel Price, Lubbock, TX (US)

(73) Assignee: SitePro, Inc., Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,707

(22) Filed: Aug. 19, 2020

(65) Prior Publication Data

US 2021/0076291 A1 Mar. 11, 2021

Related U.S. Application Data

(63) Continuation of application No. 16/208,372, filed on Dec. 3, 2018, now Pat. No. 10,779,213, which is a
(Continued)

(51) Int. Cl.
*H04W 40/02* (2009.01)
*H04W 72/02* (2009.01)
(Continued)

(52) U.S. Cl.
CPC .......... *H04W 40/02* (2013.01); *H04W 40/20* (2013.01); *H04W 48/14* (2013.01); *H04W 72/02* (2013.01);
(Continued)

(58) Field of Classification Search
CPC ... H04W 72/02; H04W 72/082; H04W 16/14; H04W 84/18; H04W 40/02; H04W 40/20; H04W 40/38
See application file for complete search history.

(56) References Cited

U.S. PATENT DOCUMENTS

| | | | |
|---|---|---|---|
| 7,924,761 B1 * | 4/2011 | Stevens | H03M 13/3761 370/315 |
| 2002/0013135 A1 * | 1/2002 | Proctor, Jr. | H04L 1/0001 455/228 |

(Continued)

*Primary Examiner* — Kent Krueger
(74) *Attorney, Agent, or Firm* — Pillsbury Winthrop Shaw Pittman, LLP

(57) ABSTRACT

Provided is a process that includes obtaining a directed acyclic graph describing a plurality wireless connections between a plurality of downstream nodes forming a multi-path route to an Internet connected wireless transceiver; determining an encoding kernel specifying transformations to be performed by the plurality of downstream nodes on data received from upstream nodes; transmitting at least part of the encoding kernel to at least some of the downstream nodes; and transmitting data from a data source to a downstream node in the directed acyclic graph specified by the encoding kernel such that the data is conveyed through the multi-hop, multi-path route to the Internet connected wireless transceiver.

26 Claims, 4 Drawing Sheets

Related U.S. Application Data continuation of application No. 14/299,723, filed on Jun. 9, 2014, now Pat. No. 10,182,385.

(51) Int. Cl.
  *H04W 48/14* (2009.01)
  *H04W 72/08* (2009.01)
  *H04W 40/20* (2009.01)
  H04W 84/18 (2009.01)
  H04W 16/14 (2009.01)
  H04W 40/38 (2009.01)

(52) U.S. Cl.
  CPC .......... *H04W 72/082* (2013.01); *H04W 16/14* (2013.01); *H04W 40/38* (2013.01); *H04W 84/18* (2013.01); *Y02D 30/70* (2020.08)

(56) References Cited

U.S. PATENT DOCUMENTS

| | | | |
|---|---|---|---|
| 2014/0131102 A1* | 5/2014 | Benson | E21B 7/04 175/45 |
| 2015/0135254 A1* | 5/2015 | Thilenius | H04L 63/02 726/1 |
| 2015/0271309 A1* | 9/2015 | Ames | H04W 4/02 455/456.1 |

* cited by examiner

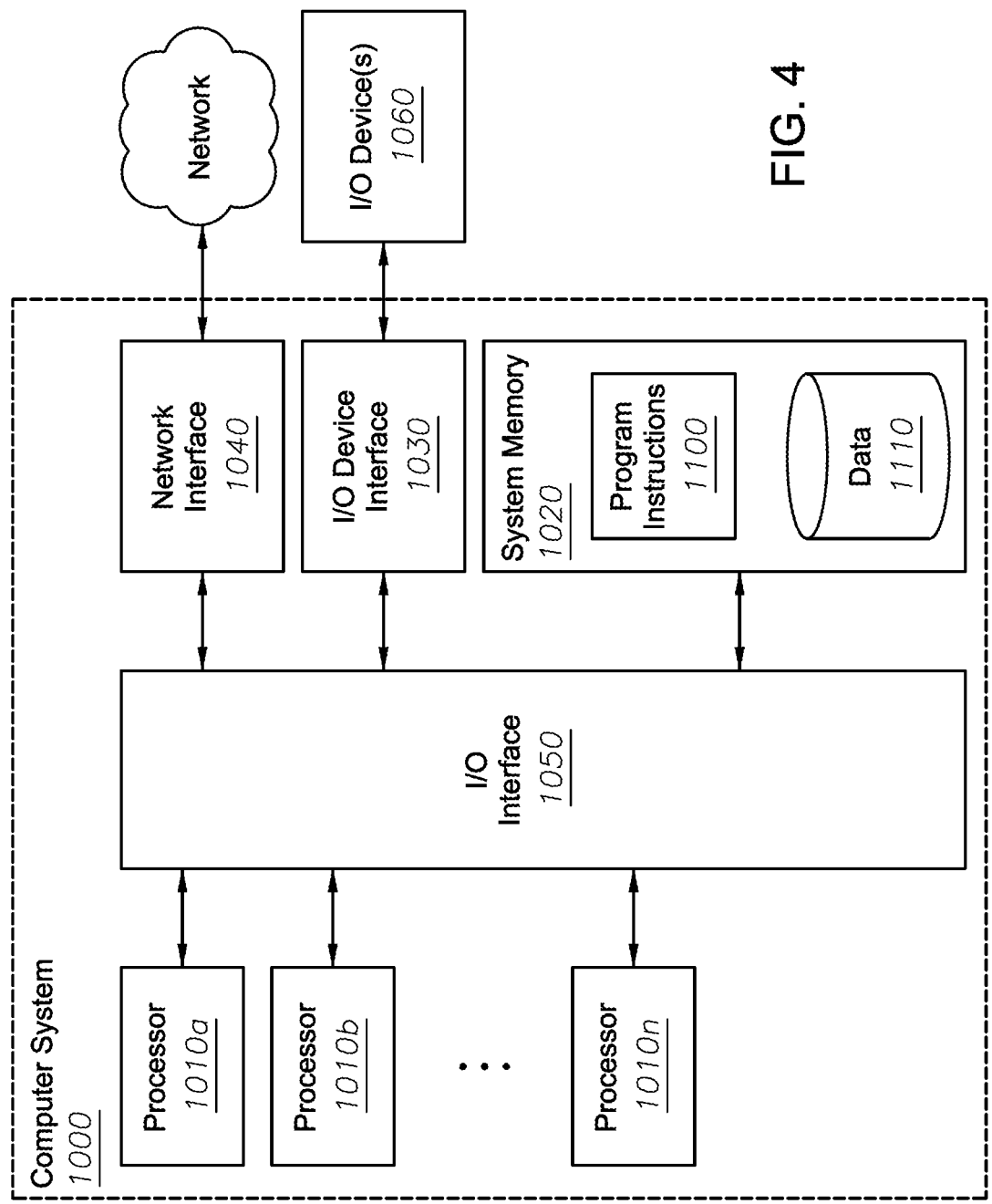

MULTI-PATH WIRELESS MESH NETWORKS

CROSS-REFERENCE TO RELATED APPLICATIONS

The present patent filing is a continuation of U.S. patent application Ser. No. 16/208,372, filed 3 Dec. 2018, and titled MULTI-PATH WIRELESS MESH NETWORKS, which is a continuation of U.S. patent application Ser. No. 14/299,723, filed 9 Jun. 2014, and titled MULTI-PATH WIRELESS MESH NETWORKS. The entire content of each aforementioned patent filing is hereby incorporated by reference.

BACKGROUND

1. Field

The present invention relates generally to wireless communication and, more specifically, to network coding and error correction in ad hoc, multi-path wireless mesh networks in oil and gas fields.

2. Description of the Related Art

Internet access in rural areas is often limited due to technical and economic factors. The existing solutions generally rely on costly, fixed infrastructure, for example, cell towers for the entire scope of coverage. The cost of such infrastructure makes those solutions prohibitively expensive in sparsely populated or uninhabited areas. Similar problems are faced in non-rural areas, though the cost-related challenges are often less severe in these environments.

To provide network access in rural areas, network engineers have proposed various forms of mesh networks. In these networks, geographically distributed nodes relay information between the end-devices and (e.g., fixed permanent, wired) Internet connections. Many existing solutions are generally limited to short range communication (e.g., WiFi™) and low bandwidth (e.g., Zigbee™ or Bluetooth™) communication. Additionally, they are often poorly designed for integration with the Internet. Further, many existing systems compete for bandwidth with established uses, such as WiFi or cellular spectrum.

Hence, there is a need to provide cost-effective and, some cases, dynamically formed mesh-networks that provide wide-area Internet (or local network) access.

SUMMARY

The following is a non-exhaustive listing of some aspects of the present techniques. These and other aspects are described in the following disclosure.

Some aspects include a process that includes determining a route through a multi-hop wireless network; receiving data from an upstream node in the network, and relaying the data to a downstream node in the network.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

Other aspects are described more fully below.

BRIEF DESCRIPTION OF THE DRAWINGS

The above-mentioned aspects and other aspects of the present techniques will be better understood when the present application is read in view of the following figures in which like numbers indicate similar or identical elements:

FIG. 4 illustrates an example of a computer system by which portions of the above features may be implemented.

Figure 1:
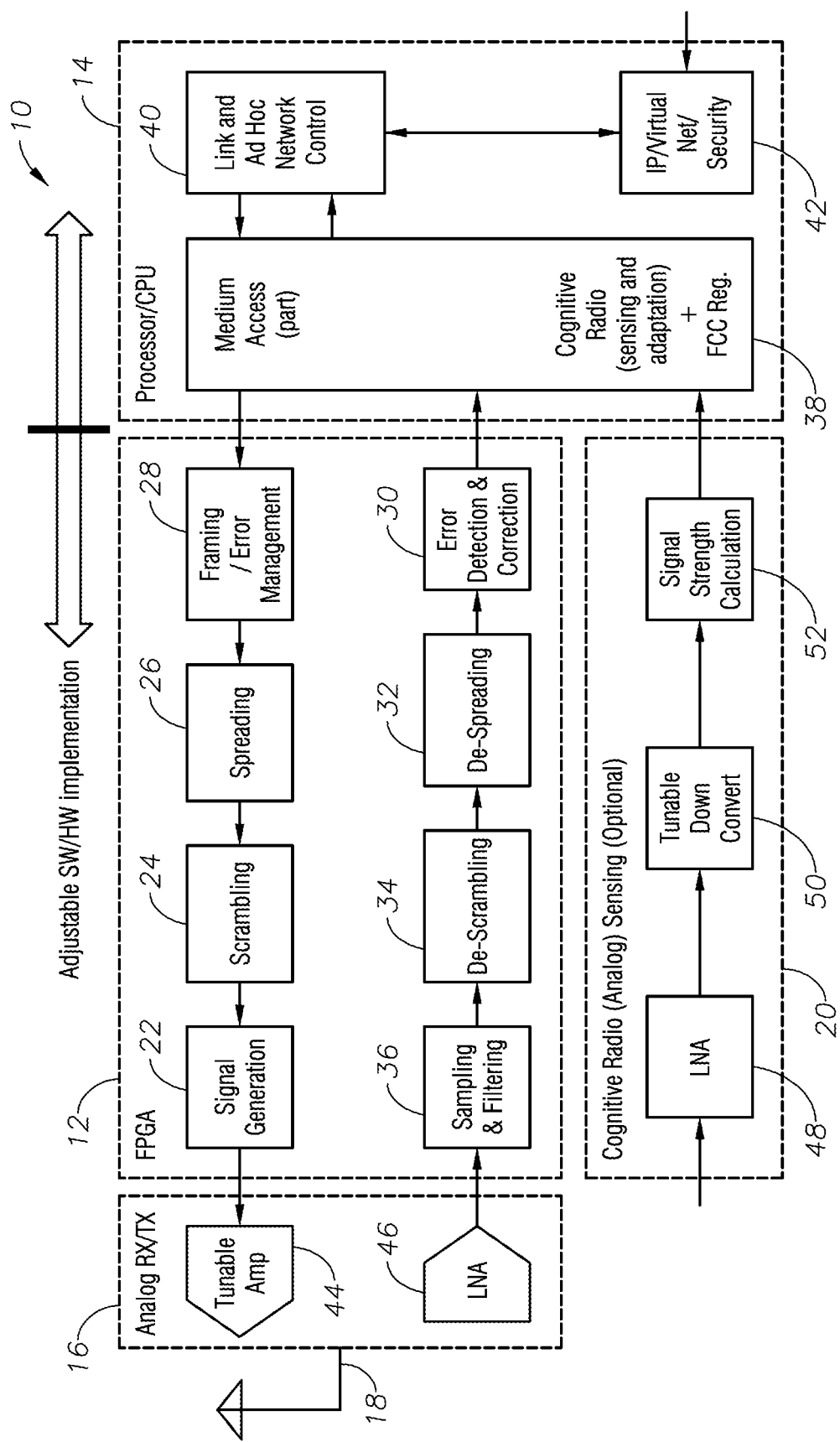
FIG. 1 illustrates an example of a node in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in wireless networking continue as applicants expect. Further, because multiple problems are addressed, it should be understood that some embodiments are problem-specific and that not all embodiments address every problem with traditional systems described herein or provide every benefit described herein. (For cost reasons, several inventions have been grouped into a single patent application.) That said, solutions to many of these problems are described with reference to FIGS. 1-4.

Among the problems recognized by the inventors and mitigated by some embodiments are the following:

a. Existing routing schemes are poorly designed to address the dynamic nature of newly available white space TV bands (or similar media) where the available frequencies change throughout the network. To mitigate this problem, some embodiments control the transmission power on each link using an adaptive scheme while estimating true, available maximum (or near-maximum) capacity along the entire (or substantial portions of) routing paths. Further, some embodiments employ adaptive schemes to learn how each link in the path interferes with adjacent links and, then, employ geometric, dynamic programming to select the route with largest expected capacity. In some cases, dynamic and multi-path routing is used to construct a wireless mesh network capable of accommodating spatially and temporally varying radio resources.

b. Moreover, such networks often coexist with other users of the white space TV spectrum, a challenge which is often ignored or avoided in existing wireless networks.

To mitigate these problems and others, some embodiments measure the channel quality in terms of interferences among adjacent networks or nodes and estimate the amount of feedback in a form of increased interference with a current node. Further, some embodiments employ a non-linear observer program (e.g., a neural network) to identify the type of interference and quantify the effect of the interference on performance of available modulation techniques.

c. Existing techniques targeting the presently described need often lack real-time adaptation of modulation and coding schemes that can accommodate varying radio channel conditions. Some embodiments provide for these features. Real time adaptation can occur at runtime without interfering with typical TCP/IP protocols, e.g., during an application layer session.

d. Many existing approaches employ a fixed implementation of a specific radio signal processing technique with permanent, unalterable circuitry. To mitigate this problem, some embodiments divide tasks between an application specific integrated circuit (e.g., forming a processor) and a field programmable gate array to improve employment of available hardware resources to enhance processing and communication performance. To this end, some embodiments support capabilities to dynamically (e.g., a runtime without interfering with typical TCP/IP protocols, such as during an application layer session, as may occur while a user interacts with a website) load various signal processing modules into the FPGA to off-load processing from a general-purpose processor provided by the ASIC (e.g., an ARM™ or Intel x86™ processor). Some embodiments select the most (or at least some, or in some cases none) initial radio frequency (RF) signal processing steps that can fit into the available FPGA resources. In some of these embodiments, when the modulation and coding technique is changed by the channel access scheme, the FPGA is reloaded with the corresponding signaling steps in response by a given node.

e. Network nodes generally use a power supply and occupy land that, ideally in some implementations, spans a large geographic area. Obtaining these resources can be prohibitively expensive for a party seeking to build a rural wireless network. To mitigate this problem, some embodiments are designed to draw power from, and be geographically co-located with (e.g., physically, electrically, and communicatively coupled with), oil-and-gas (or other mineral extraction process) related equipment (e.g., oil wells, salt water disposal facilities, pumping stations, and the like), which are often geographically distributed over rural areas, have power on hand for other purposes, and often benefit from network access provided by the present techniques, potentially offering a synergy between provision of consumer and industrial network access. Further, the relatively persistent nature of a portion of the nodes on the network provided by such sites may be accounted for when selecting routes, e.g., by up-weighting routes in a route scoring process according to the amount (e.g., number or frequency) of such fixed-site nodes in the route, thereby providing more stable connections and reducing overhead relative to systems that operation with the assumption that all nodes are mobile and transient. To this end, route reply messages described below may include an indication of whether a node has a permanent (e.g., non-battery) power supply and is geographically fixed.

To address the problems above and other issues with conventional techniques, some embodiments include nodes (e.g., a wireless transceiver having a processor and memory programmed to implement one or more of the protocols described herein) that include relatively flexible, dynamic hardware based on a combination of an FPGA and a dedicated ASIC processor. The former, in some embodiments, facilitates real-time, efficient hardware implementation of communication schemes and protocols. The FPGA is more flexible than an ASIC processor in some cases because the code (e.g., hardware description code) can be changed at runtime to implement a more efficient method for the circumstances at hand and embodiments can adjust these processes at runtime to be more efficient for the current environment, e.g., as the channel condition changes. The latter, in some cases, can execute arbitrary software, making the system relatively flexible, e.g., when the ASIC is a CPU. In some embodiments, each of these components may implement any part of signal processing, communication technique, and network protocol stack, making the system flexible and re-configurable as network conditions change. In some implementations, embodiments dynamically shift the processing between the FPGA and the dedicated processor with software executing on the ASIC processor to improve performance relative to an ASIC-only or an FPGA-only system. Additionally, in some embodiments, the processing techniques are changed dynamically (both in the FPGA and in the software executing on the ASIC processor) to adapt to changing conditions in available radio channels. Examples of such changing conditions include a change in channel interference from other devices, changes in available TV channels, and varying traffic patterns. In contrast, many existing techniques do not provide for runtime changes in FPGA configuration. Control-theoretic improvements and decision-making may be executed by some embodiments to both identify and adapt to changing channel and network conditions. In some cases, such determinations may be made during runtime (e.g., without rebooting or turning off a node) by a neural network observer (e.g., a process that dynamically detects conditions and, in response, determines parameters of the system, like transmit power, coding parameters, and transmit frequencies) and controller executed by the ASIC processor, in some cases, with mathematically guaranteed convergence and stability, e.g., by selecting weight update rules that converge on an appropriate solution, for instance, with offline testing to confirm convergence.

In some cases, a modulation technique for transmitting data is selected (e.g., by the ASIC processor, or by the FPGA) based on available RF resources as sensed by an antenna of a node, e.g., free TV channels, and channel parameters, e.g., existing noise level and signal fading. Additionally, in some embodiments, data traffic may be transmitted in packets through multiple parallel paths using, in some cases, a hybrid scheme that combines routing and network coding. Examples of such a hybrid scheme are described in *Analysis of General Network Coding Conditions and Design of a Free-Ride-Oriented Routing Metric*, by Bin Guo et al., published in IEEE Transactions on Vehicular Technology, Vol. 60, No. 4, on May 2011, an article the entire contents of which are incorporated by reference herein for all purposes. In some embodiments, each node (or a subset of nodes) may select a plurality of respective sub-networks of two (or three, or four or more for greater network efficiency or less for reduced computational complexity) hop neighbors nodes to the respective nodes for which a network coding and routing solution is solved by the respective nodes, which limits computational complexity and allows the nodes to optimize for the smaller problem defined be each sub-network. This is expected to increase the likelihood of delivery of data to an end node (e.g., a sink node, such as a gateway node having access to the Internet, for instance via a cellular connection or a wired connection) in a multi-hop network with dynamic topology.

In some embodiments, routes may be selected with ad hoc on demand distance vectoring (AODV). In some forms of AODV, the network may be generally silent with respect to establishing a route until a connection is needed. At that point, the source network node that needs a connection may determine that such a connection is needed and in response wirelessly broadcasts a request for connection. The request transmission may be a message with a message identifier that distinguishes the message from other route requests initiated by other nodes or at other times and the message may include an identifier of the destination node to which a route is requested, as well as an identifier of the source node. Other nodes may receive this message, determine that it is a request for a connection, and in response, forward this message, and record in routing tables in memory of each respective receiving node an identifier of the node that they heard it from, thereby creating an collection of candidate temporary routes back to the needy (e.g., source) node in the form of a distributed linked list through the nodes (e.g., a plurality of directed graphs). When a node receives such a message, that node may retrieve routing table entries from memory to determine whether it already has a route to the destination node. In response to such a determination, that node may wirelessly send a message backwards through a candidate temporary route to the requesting node along with an identifier of the route. The source node in need of a route then may receive a plurality of returned messages through a plurality of different routes and, in response, may select the route that has the least number of hops through other nodes (or other ranking techniques may be used, e.g., with a weighted score favoring routes through static nodes connected to power sources on industrial equipment, like on oil-and-gas related equipment). Unused entries in the routing tables may be recycled after a threshold time, e.g., daily by routines executed by the respective nodes. Other embodiments may implement other routing protocols, e.g., dynamic source routing (DSR) or backpressure routing.

In some cases, routes and the outputs relayed from each node may be determined by implementing network coding in a network of nodes (e.g., with the hybrid approach noted above or with pure network coding). Any of several forms of network coding may be implemented in the present embodiments. Examples are described in *Network coding theory: An introduction*, by Raymond W. Yeung, Front. Electr. Electron. Eng. China 2010, 5(3): 363-390, an article which is incorporated by reference herein in its entirety for all purposes. Depending on the application, any of the various techniques described therein may be used, e.g., the described linear network coding techniques for acyclic directed graphs are expected to offer relatively favorable levels of computational complexity. For instance, embodiments may implement linear network coding in an acyclic network to render calculation and distribution of the global encoding kernels more computationally feasible, particularly in larger networks. Some embodiments may use the Jaggi-Sanders algorithm to determine the global encoding kernels, particularly when larger fields are used to reduce computational complexity and render the calculation tractable.

In some cases, network coding may be defined by a global encoding kernel or local encoding kernels. The output of each node relaying data through the mesh network may be determined based on the inputs to the node and the relevant encoding kernel(s) for that node. In some cases, prior to transmission, a given node obtains the downstream order of nodes (which in some embodiments may be a multi-path route), as reflected in a directed graph of node identifiers in memory of a given node. That node may generate a global encoding kernel and encode parameters of the same in a header of a message to be sent to the downstream nodes. In some cases, each node downstream retrieves the relevant parameters for its retransmission from the header portion of the message based on a node identifier associated with the relevant parameters in the header. In some cases, each message header further includes a sequence identifier, indicating where that transmission is within a given route, and nodes use the sequence identifier to avoid cyclic transmissions.

A number of techniques may be used to reduce the computational cost of calculating encoding kernels. Some implementations may limit the number of options for retransmission to two or three of the nearest destinations that are connected to the Internet. Some embodiments may partition the problem of solving the graph with a limited number of pre-defined gateways. Some embodiments may have a hybrid architecture in which certain nodes are configured for longer range transmission (e.g., with directional antennas and higher transmission power), e.g., an oil field cluster of a dozen nodes may route through a longer range transmitter to reach the Internet. Some embodiments may employ broadcast multi-path routing in which each gateway to the Internet receives a copy of data to be conveyed.

In some cases, the network coding kernels may be selected such that redundant information from a given data transmission arrives at a destination node, and the redundant information may be used for error detection or error correction. For instance, a destination node (or a relay node) may receive a message with such redundant information via a multi-path route and determine that the message lacks redundant information, e.g., that it is internally inconsistent according to the error detection or correction protocol in use. In response to error detection, the node may reply with a signal indicating the error and requesting retransmission from the source node. Or the redundant information may be used to correct an error. In some embodiments, embodiments may channel code data for error detection or error correction, e.g., with Turbo codes or low density parity-check codes.

In some embodiments, a systematic solution (e.g., a network code) may be derived using graph theory algorithms to approach or achieve a max-cut/min-flow optimality (or near optimality, e.g., approaching an optimal solution while making tradeoffs to obtain responsiveness or reduce costs). Some embodiments may provide for network-wide optimization though the network coding. In some cases, this may be implemented with integrated network coding with MAC (medium access control) and PHY (physical) layers (e.g., as described in the Open Systems Interconnection (OSI) model) provided for at each node. Further, as described below, transmission may be implemented with a spreading code.

A variety of techniques may be used for medium access control, each of which may be implemented with a properly programed memory and processor in each respective network node. For instance, some embodiments may implement distributed random medium access by employing a spread spectrum coding technique. Some such embodiments may generate pseudo noise (PN) sequences that exhibit auto-correlation properties (e.g., the correlation between shifted copies of the code is equal to "1" only when the offset is 0 or a multiple of the sequence length, or in other cases the correlation is close to 0, one example being Gold codes). In some cases, instead of employing the PN sequence in continuously, as is often done in traditional systems, the some embodiments adaptively select a piece (e.g., subsection) of the code for the specific node to use.

An example algorithm for code selection (e.g., a PN sequence) executed by (and thus stored in memory of) each respective node is as follows:

a. Nodes obtain a PN sequence and each randomly (e.g., pseudo randomly) select the initial offset in the PN sequence they will employ for communication.

b. The nodes begin communication using a fixed, common-offset code to communicate with neighbors. At that time, the nodes may share with one another their selected offset and code ratio (e.g., the spreading strength or gain, which is generally equal to a ratio of the number of PN sequence chips ("bits") that will be used to encode (e.g., in this context, spread) the data bits to a number of the data bits, where the more chips that are employed per data bit, the higher the processing gain and more simultaneous transmissions that are possible, but at the same time, the user data rate decreases).

c. Nodes may store in their respective memory the offsets and code rates (lengths) for the active links. In some cases, network coding and routing may be used to reduce the number of saved codes based on network topology.

d. Subsequent communications may employ the nodes' individual codes (e.g., part of the PN sequence with a specific offset and rate/length). A broadcast (e.g. sporadic routing updates) may employ the fixed, common-offset code, while the individual links may employ receiver based coding (e.g., each transmitter may use the code of the receiver).

e. The measured interference and link quality (e.g., based on number of bit-errors or corrupted frames) may be employed in an adaptation algorithm to change the code ratio (e.g., a ratio of a number of chips to a number of bits). An adaptive algorithm may estimate channel state and, in turn, determine a suitable code ratio. For instance, a relatively good channel/low interference may cause a node to decrease the ratio, thus increasing a user data rate. Alternatively, such an algorithm executed by each node may otherwise increase the ratio, thereby increasing resilience to interference and increasing a number of supported, adjacent links.

f. The code offset may also be varied when number of collisions increases (e.g., due to overlapping sections of the PN sequence). In such a scenario, first, the offset may be varied (e.g., increased or decreased) by a small number of chips (e.g., PN sequence chips). The correlation of the per-node code may be a measure of overlap, where lower correlation may indicate that an overlapping code is employed in vicinity. In response to determining that a correlation is below a threshold, a node may update its code offset to thereby increase the correlation. When a satisfactory point offset is not found, the node may repeat from the first step, varying the offset.

Other embodiments may use other forms of media access control, for instance, time division multiple access (TDMA) or orthogonal frequency-division multiple access (OFDMA).

Some embodiments may transmit in the broadcast television whitespace spectrum recently made available by the United States Federal Communications Commission. Thus, available frequencies and transmission strengths may vary by geographic location (which may be changing for mobile nodes) and by time of day (e.g., as other transmitters move into and out of broadcast range of a given node). In some embodiments, nodes may sense their current wireless environment with a spectrum sensing approach to determine available channels, e.g., unused TV spectrum. Additionally, or alternatively, nodes of some embodiments may identify unused spectrum, e.g., vacant channels, based on a geolocation sensor on each node (e.g., a Global Positioning System, or other satellite navigation system, sensor operative to sense geographic location, or for some fixed nodes, to reduce cost, a value programmed in memory indicative of geolocation) and the capability to access through the Internet a remote database that identifies incumbent licensed operations entitled to interference protection. Embodiment nodes may sense their geolocations and send a query, in some cases via the mesh networks described herein, to such a database for available spectrum and, in response, select spectrum for transmission by a given node. (Protected incumbent operations may include, for example, TV stations, broadcast auxiliary point-to-point facilities, low power auxiliary service operations (wireless microphones), and the like.) Such a remote database may also include records reflecting protected locations and channels of certain radio frequency services that are not recorded in FCC databases, such as the locations of cable headends and low power TV receive sites that are outside the protected contours of the TV stations whose signals they receive. The database accessed by an embodiment node may respond with a list of TV channels that are vacant and can be used at the device's location.

Whitespace spectrum may be updated (e.g., re-selected) periodically (e.g., every minute, hour, or day) or in response to some event (e.g., receiving a request to transmit data, detecting the existence of non-native transmission the current frequency, or determining that a signal-to-interference-plus-noise ratio (SINR), packet loss, or congestion has crossed a threshold). Once a node determines to update the frequency or (i.e., and/or) power at which it transmits, a node may query a remote whitespace database as described above via the Internet with the node's current geographic location and select among the responsive unclaimed spectrum. Some embodiment nodes may select a frequency from among the responsive spectrum based on a balance (e.g., an aggregate value, such as a weighted score) between data rate and distance. Generally, data rate increases as transmit frequency increases, while transmit distance at a given power decreases as frequency increases. Some embodiments may combine OFDMA with CDMA to use wider or non-continuous bands.

Some embodiment nodes may select among available spectrum by iterating down through available frequencies, e.g., by starting at a high frequency, and then decreasing by a decrement until a signal (e.g., an ACK, or acknowledgement signal) is received from another node (or from two or more nodes or other thresholded count or other amount) indicating that the transmission was successful. Such an arrangement is expected to yield relatively high data rates while accommodating the geographic arrangement in which a node finds itself relative to other nodes. In some cases, at a given frequency, a node may retry transmission before determining to iterate to a lower frequency in the absence of an ACK signal, as transient noise may lead to unnecessarily low frequency selections. For instance, some embodiment nodes may apply a Long Retry Limit (LRL) before decrementing, where the LRL is a number of retransmission attempts for frames longer than a request to send threshold, or a value where frames larger than the threshold are preceded by a request to send/clear to send exchange. In other examples, some embodiment nodes may apply a Short Retry Limit (SRL) before decrementing, where the SRL is a number of retransmission attempts for frames shorter than a request to send threshold. In other examples, a retry limit may be dynamically selected based on movement of nodes in a network, e.g., a retry limit may be increased in response to the relative speed of a node (for instance, as sensed by a GPS sensor of the node) increasing. In such an implementation, if a node is moving faster, that node (in some embodiments) is quicker to infer that it is having a transmission problem and adjust to a lower frequency, trading data rate for transmission range.

Transmission power may be selected by each node with a variety of techniques. In some cases, after selecting a transmission frequency, embodiments may determine transmission power. Generally, nodes waste spectrum and power by transmitting more powerfully than needed, so some embodiments seek to reduce transmit power. In some cases, when replying to a route request message, a node senses its current geolocation and velocity vector by polling a GPS sensor of the node and transmits the same along with a reply to the route request message. A receiving node may then, in response to the reply, calculate a transmit power based on a distance from that node (as sensed by polling a GPS sensor of the receiving node) to the replying node and, in some cases based on magnitude of a vector formed by subtracting the velocity vectors of the two nodes. The resulting transmit power and frequency may be stored in memory of the respective node and used for subsequent transmissions until updated.

An example node and network for implementing the above techniques is described with reference to FIGS. 1-4.

FIG. 1 is a block diagram showing the architecture of an embodiment of a node's network interface. In some embodiments, the node may be an example of the computer system described below with reference to FIG. 4. In some embodiments, the node of FIG. 1 may be one of the site master controllers described in U.S. Pat. No. 8,649,909, the contents of which are incorporated by reference herein in their entirety for all purposes, and the components of FIG. 1 may be the network interface described as part of the site master controllers.

FIG. 1 shows an example of a node 10 in accordance with some embodiments. In some cases, the node 10 further includes additional computing hardware, such as some or all of the components of the example computer system described below with reference to FIG. 4, with the illustrated features of FIG. 1 serving the role of the network interface 1040 in FIG. 4, or the node 10 is a site master controller with the components of FIG. 1 serving the role of a network interface. The components of the node 10 are described with reference to discrete functional blocks for purposes of explanation, but it should be understood that hardware or software by which these functional blocks are constructed may be arranged differently, for example, intermingled, conjoined, distributed, replicated, or otherwise arranged. In this example, the node 10 may include a field programmable gate array 12, a central processing unit 14, an analog receive and transmit module 16, and an antenna 18. In some cases, the node 10 may also include an optional cognitive radio 20, which is not to imply that any other components described herein are not optional or are required in every implementation.

As noted above, the allocation of signal processing tasks between the field programmable gate array 12 and the CPU 14 may be dynamically balanced, for example, by components described below executing on the CPU 14. Accordingly, it should be kept in mind that components described as being part of the field programmable gate array 12 or the CPU 14 may, in some use cases, be shifted to other hardware, in some cases during operation.

In the illustrated embodiment, the field programmable gate array 12 includes an output pipeline having a signal generation module 22, a scrambling module 24, a spreading module 26, and a framing in error management module 28, which receives as input signals from components described below as being part of the CPU 14.

The signal generation module 22, in some embodiments, performs the task of converting from the digital domain to the analog domain for wireless transmission.

The scrambling module 24, in some embodiments, performs the task of randomizing the signal to improve performance of some of the signal processing techniques described herein.

The spreading module 26, in some embodiments, performs the task of using CDMA (or OFDMA) to spread and map a narrow signal to wider frequency bands.

The framing and error management module 28, in some embodiments, performs the task of medium and physical layer protocol framing and implements error correction codes, e.g., by calculating redundant data based on input data for transmission and injecting the redundant data into the data for transmission, e.g., by applying low density parity codes or performing Turbo coding.

The field programmable gate array 12 of some embodiments further includes an input pipeline that receives signals (e.g., wirelessly received analog signals) from the antenna 18 and provides signals (e.g., digitally encoded data) to components described below with reference to the CPU 14, including an error detection and correction module 30, a despreading module 32, a descrambling module 34, and a sampling and filtering module 36.

The error detection and correction module 30, in some embodiments, performs the task of detecting and correcting errors (e.g., by examining received data to determine whether it contains the internal redundancy indicative of a correctly received signal) and parsing data from frames.

The despreading module 32, in some embodiments, performs the task of combining the wideband spread signal into a narrow band signal that can be then decoded.

The descrambling module 34, in some embodiments, performs the task of reversing the operations performed by an upstream scrambling module and synchronizes the signal into the node's time domain.

The sampling and filtering module 36, in some embodiments, performs the task of converting the analog signal received to a digital signal and applying filters to eliminate extraneous signals.

In the illustrated implementation, the CPU 14 may include a medium access manager 38 (which cooperates with other components to form a medium access controller), a network controller 40, and a security module 42.

The medium access manager 38, in some embodiments, performs the task of providing random access to the channel with support for transmission of acknowledgement signals to confirm the reception of a signal to a transmitting node. In some cases, the medium access manager 38 is operative to perform the steps described herein for determining a broadcast strength and frequency on whitespace spectrum, for example, by sensing with the cognitive radio unused channels, or by querying a whitespace database, and adjusting through a range of channels until an acceptable trade-off between data rate and broadcast range is found.

The network controller 40, in some embodiments, performs the task of implementing the routing scheme and network coding routines.

The security module 42, in some embodiments, performs the task of creating a virtual network of the end nodes where the actual communication network becomes transparent to the nodes while encrypting the data to prevent eavesdropping or data falsification by third parties.

In the illustrated implementation, the analog receive and transmit module 16 may include an amplifier 44, such as a tunable amplifier, that receives a signal from the signal generation module 22, and a low noise amplifier 46 that outputs wirelessly received signals to the sampling and filtering module 36.

The low noise amplifier 46, in some embodiments, performs the task of amplifying the analog signal that is received, e.g., with an adjustable gain. In some cases, the amplifier 46 receives wireless signals received by the antenna 18, such as signals from other nodes, and amplifies those signals before subsequent processing occurs.

The tunable amplifier 44, in some embodiments, performs the task of amplifying the transmitted analog signal. In some implementations, the amplifier 44 amplify signals to an adjustable signal strength before the signals are transmitted with the antenna 18, for example, to other nodes.

In some cases, the node 10 includes a cognitive radio 20 for sensing the current wireless environment, for instance, based on signals from antenna 18, and selecting whitespace spectrum for use without referencing a remote whitespace database. To this end, some embodiments of cognitive radio 20 include an amplifier 48, such as a low noise amplifier, a tunable down converter module 50, and a signal strength calculator 52.

The amplifier 48, in some embodiments, performs the task of amplifying analog signals sensed to evaluate whether the channel is available.

The tunable down converter module 50, in some embodiments, performs the task of converting higher frequencies to lower frequencies amenable to processing by digital circuitry.

The signal strength calculator 52, in some embodiments, performs the task of performing the analog to digital conversion of a signal and calculation of signal strength to detect existing transmissions.

In some cases, the node 10 serves the role of a gateway node and includes an additional network adapter, such as a cellular interface having a cellular radio or an Ethernet network adapter for interfacing with a wired network. In these examples, the gateway node 10 may use the additional network adapter to exchange data with the Internet on behalf of other nodes in the network, and the gateway node itself, depending upon the source or destination of the data to be conveyed.

Figure 2:
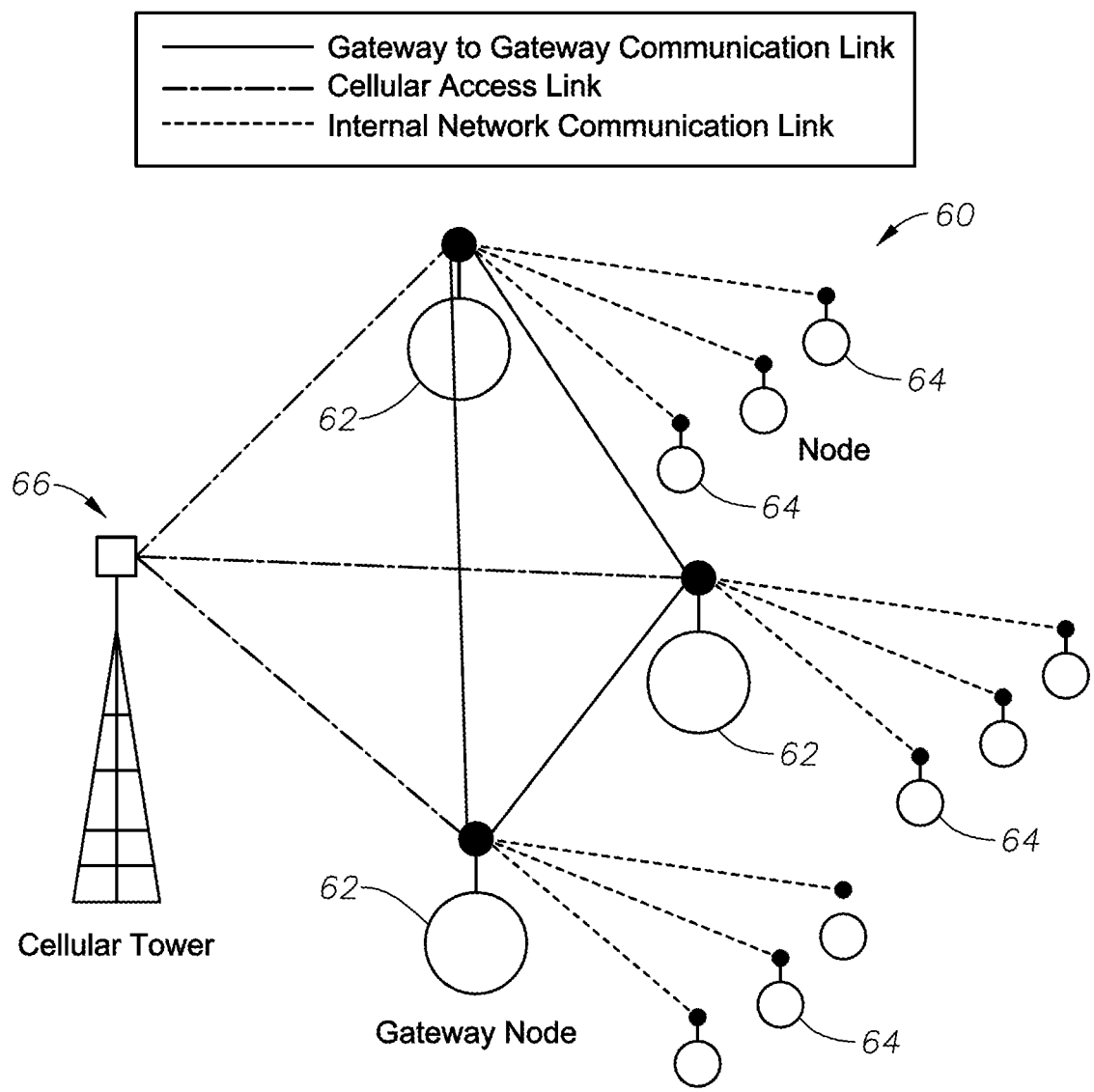
FIG. 2 illustrates an example of a network in accordance with some embodiments.

FIG. 2 is an example of an ad hoc wireless, multi-hop, multi-path, mesh-network implemented with the presently described nodes.

Some embodiments may communicate in white space TV bands with the following functionality: speeds of 500 kbps and up; range of 2-20 miles; ad hoc networking; and Ethernet/IP based interface to outside world. To this end, some embodiment nodes may include a programmable radio operating in the 400 MHz-1.8 GHz bands. In some cases, a cognitive radio configured to operate within FCC limits in the whitespace spectrum is used. Some networks may include Ethernet/IP based interfaces to the Internet and a mineral-extraction related industrial site (e.g., an oil-and-gas related equipment in the field). Some embodiments may include directional antennas for larger range transmission, e.g., between geographically fixed nodes.

Some nodes may serve as gateway nodes, which may have one or more of the following features: some gateway nodes may be capable of connecting multiple nodes to the Internet through multi-hop communication; some gateway nodes may supply node-to-node communication via a protocol such as AODV or one or more of the forms of network coding described herein; some gateway nodes may be capable of supporting data transmission of up to 20 local sensing nodes at one site and up to 10 remote sites. In some embodiments, gateway nodes include an additional radio for cellular communication. Generally, non-gateway nodes convey data between leaf (or source) nodes of the network (e.g., industrial equipment sensors or controllers or user modems) and a gateway node with which a mesh network is formed.

In some cases, gateway nodes (or other, non-gateway nodes) include an antenna placed at 8-10 ft or higher above ground level for longer range. In some cases, nodes have a fixed (e.g., non-battery) electric power source, such as is often found at fixed salt-water injection sites or oil/gas wells. In some cases, nodes have universal serial bus (USB) or Ethernet connectivity to provide an interface for control by personal computer (PC) or Internet access if a wired or wireless (e.g., cellular) connection is available. In some embodiments, nodes may be able to transmit data on a single link at distances from 100 yards to few miles. The communication range, in some cases, extends to 25 miles. Nodes, in some embodiments, support transmission rates for a telemetry applications, e.g., pressure levels, on/off status, monitoring operations including arrival of trucks and loads, billing messages, and other data often generated at oil-and-gas related sites, like saltwater disposal facilities or drilling sites. In some cases, nodes may support transfers of messages at 100 bytes per second rates or higher to meet industrial equipment bandwidth needs.

In some cases, a network formed with the nodes described herein may be used to provide consumer Internet access, in addition to, or as an alternative to, conveying data obtained from (or directed to) oil and gas related facilities. For example, some nodes may have an Ethernet port and network interface by which a consumer may connect a local area network or personal computer to use the node as a modem for obtaining Internet access in rural areas.

FIG. 2 shows an example of an ad hoc multi-hop multi-path wireless mesh network that may be constructed with examples of the wireless nodes described herein. A relatively small number of gateway nodes 62 and non-gateway nodes 64 are illustrated by way of example, but it should be understood that substantially more nodes may be used in commercial embodiments. Further, the illustrated embodiments include a single hop between the non-gateway nodes 64 and the gateway nodes 62, but in other embodiments, signals may pass through multiple non-gateway nodes before being relayed to a gateway node 62. In some cases, the nodes 62 and 64 may be distributed throughout a rural oil bearing region, and some or all of the nodes may be each associated with a respective piece of oil or gas related equipment, such as oil wells, pumping stations, reinjection facilities, salt water disposal facilities, and the like. In some cases, each node may draw power from a power supply associated with such equipment and convey data from and commands to such equipment from remote operators. In other cases, some or a substantial portion or all of the nodes may be mobile nodes, for example, associated with trucks and other equipment driving through oilfields to service equipment. Of course, applications are not limited to the oilfield, and other industries are expected to benefit from the present techniques.

In some cases, nodes associated with fixed assets, like oil and gas equipment, having a reliable and steady power supply, such as a generator or grid power, may broadcast such attributes during route selection such that routes passing through those nodes may be up weighted when ranking candidate routes to favor routes having less transient stable nodes.

In the illustrated figure, Internet access is provided via a cellular tower 66 that communicates with a cellular network interface on the gateway nodes 62, but it should be understood that other forms of Internet access may communicate with the gateway nodes, including wired Internet connections.

Figure 3:
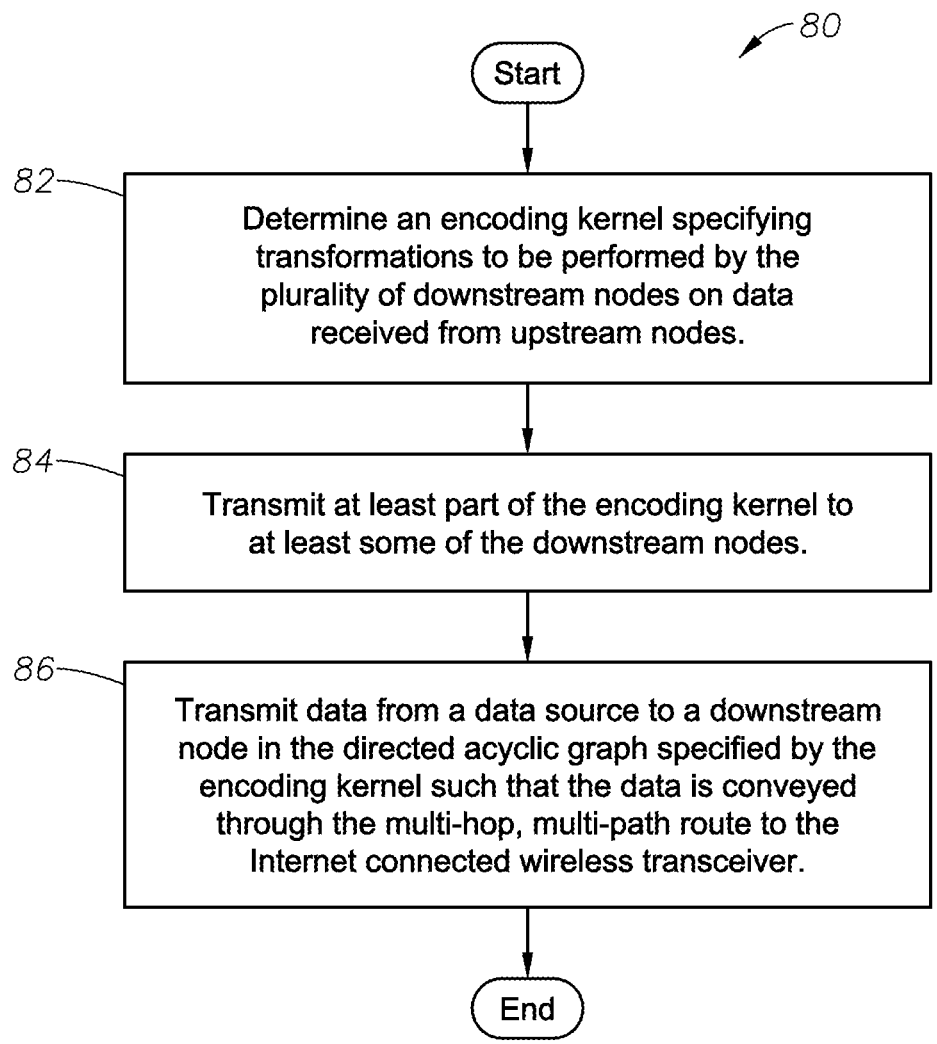
FIG. 3 illustrates an example of a process of forming the network of FIG. 2 with the nodes of FIG. 1 in accordance with some embodiments.

FIG. 3 shows an embodiment of a process 80 for transmitting data through an ad hoc multi-path multi-hop wireless network. In some cases, the process 80 is performed by the above-described node 10, though applications are not limited to that particular set of arrangements. In this example, the process 80 includes determining an encoding kernel specifying transformations to be performed by the plurality of downstream nodes on data received from upstream nodes, as indicated by block 82. In some cases, the transformation includes an aggregation of input signals from two other upstream nodes to produce a single output signal sent to a single downstream node, in accordance with some of the network coding techniques described herein.

Next, embodiments may transmit at least part of the encoding kernel to at least some of the downstream nodes, as indicated by block 84, a process which may include transmitting all of the encoding kernel to all of the downstream nodes. A node is said to be downstream if that node lies along a route from a given node to a destination of data to be conveyed through the wireless network. In some cases, the encoding kernel is transmitted as part of a header of a frame conveying data through the wireless network, and downstream nodes may extract the relevant portions of the encoding kernel from the header.

Some embodiments may further transmit data from a data source to a downstream node in a directed acyclic graph corresponds to the encoding kernel, such that the data is conveyed through the multi-hop, multi-path route to an Internet connected wireless transceiver, such as a gateway node, as indicated by block 86. In other embodiments, the data may be transmitted from an Internet connected wireless transceiver using process 80 with the gateway node lying in the upstream position for that use case.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

To mitigate the problems described herein, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, solutions to many of these problems are described above.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A node configured to cooperate with other nodes to form a multi-hop, multi-path, ad hoc wireless network for conveying data to, from, or relaying through geographically distributed oil and gas sites, including sites selected from among salt water disposal facilities, oil wells, pumping stations, or combinations thereof, the node comprising: one or more processors; a programmable radio communicatively coupled to the processor; and memory communicatively coupled to the processor and storing instructions that when executed by at least some of the processors cause operations comprising:

obtaining a directed acyclic graph describing a plurality wireless connections between a plurality of downstream nodes forming a multi-path route to an Internet connected wireless transceiver; determining an encoding kernel specifying transformations to be performed by the plurality of downstream nodes on data received from upstream nodes, wherein: the encoding kernel corresponds to a multi-hop, multi-path route through the directed acyclic graph, the transformations including a combination of two or more inputs to a downstream node to be transmitted as output, and the data includes redundant information to be used for error detection or error correction to be received at a downstream node; transmitting at least part of the encoding kernel to at least some of the downstream nodes; and transmitting data from a data source to a downstream node in the directed acyclic graph specified by the encoding kernel such that the data is conveyed through the multi-hop, multi-path route to the Internet connected wireless transceiver.

2. The node of embodiment 1, comprising a site master controller configured to monitor or control a respective one of the following: an oil well, a petro water disposal or re-injection facility, or a petroleum pumping stations.

3. The node of any of embodiments 1-2, wherein the operations comprise: determining a transmit frequency; and adjusting the programmable radio to transmit at the determined transmit frequency.

4. The node of embodiment 3, wherein determining a transmit frequency comprises: obtaining a geolocation from which transmitting data is to occur; querying a remote whitespace database with the geolocation to obtain available frequencies; and selecting a transmit frequency from among the available frequencies responsive to the query.

5. The node of embodiment 3, wherein determining a transmit frequency comprises: attempting to transmit at a first frequency; determining that an acknowledgement signal (ACK) responsive to the transmission at the first frequency has not been received within a duration of time; and attempting to transmit at a second frequency, the second frequency being lower in frequency than the first frequency.

6. The node of embodiment 5, wherein the first frequency and the second frequency are selected from among a plurality of frequencies responsive to a query to a remote whitespace database.

7. The node of any of embodiments 1-6, wherein the operations comprise: selecting a pseudo random code to perform code division multiple access channel coding; and encoding the data from the data source with the pseudo random code to transmit the data from the data source, wherein transmission is spread among multiple frequencies.

8. The node of embodiment 7, wherein selecting a pseudo random code comprises:
dynamically adjusting a code ratio with which the data from the data source is encoded based on channel state.

9. The node of any of embodiments 1-8, wherein the one or more processors comprise: a field programmable gate array (FPGA); and an application specific integrated circuit (ASIC) central processing unit, wherein the operations comprise: dynamically re-allocating communications protocol tasks from the FPGA to the CPU.

10. A method, comprising: obtaining a directed acyclic graph describing a plurality wireless connections between a plurality of downstream nodes forming a multi-path route to an Internet connected wireless transceiver; determining an encoding kernel specifying transformations to be performed by the plurality of downstream nodes on data received from upstream nodes, wherein: the encoding kernel corresponds to a multi-hop, multi-path route through the directed acyclic graph, the transformations including a combination of two or more inputs to a downstream node to be transmitted as output, and the data includes redundant information to be used for error detection or error correction to be received at a downstream node; transmitting at least part of the encoding kernel to at least some of the downstream nodes; and transmitting data from a data source to a downstream node in the directed acyclic graph specified by the encoding kernel such that the data is conveyed through the multi-hop, multi-path route to the Internet connected wireless transceiver.

11. The method of embodiment 10, comprising sharing a power supply with a respective one of the following: an oil well, a petro water disposal or re-injection facility, or a petroleum pumping stations.

12. The method of any of embodiments 10-11, comprising: determining a transmit frequency; and adjusting the programmable radio to transmit at the determined transmit frequency.

13. The method of embodiment 12, wherein determining a transmit frequency comprises: obtaining a geolocation from which transmitting data is to occur; querying a remote whitespace database with the geolocation to obtain available frequencies; and selecting a transmit frequency from among the available frequencies responsive to the query.

14. The method of embodiment 12, wherein determining a transmit frequency comprises: attempting to transmit at a first frequency; determining that an acknowledgement signal (ACK) responsive to the transmission at the first frequency has not been received within a duration of time; and attempting to transmit at a second frequency, the second frequency being lower in frequency than the first frequency.

15. The method of embodiment 14, wherein the first frequency and the second frequency are selected from among a plurality of frequencies responsive to a query to a remote whitespace database.

16. The method of any of embodiments 10-15, comprising: selecting a pseudo random code to perform code division multiple access channel coding; and encoding the data from the data source with the pseudo random code to transmit the data from the data source, wherein transmission is spread among multiple frequencies.

17. The method of embodiment 16, wherein selecting a pseudo random code comprises: dynamically adjusting a code ratio with which the data from the data source is encoded based on channel state.

18. The method of any of embodiments 10-17, comprising: dynamically re-allocating radio frequency signal processing tasks from a field programmable gate array (FPGA) to an application specific integrated circuit (ASIC) central processing unit.

19. The method of any of embodiments 10-18, comprising: sensing a parameter of an oil well, the parameter being at least part of the data from a data source transmitted to a downstream node.

20. The method of any of embodiments 10-19, comprising: receiving a request for a website from a consumer wireless modem, the request for a website being at least part of the data from a data source transmitted to a downstream node.

What is claimed is:

1. A node comprising:
one or more processors;
a radio communicatively coupled to the one or more processors; and
memory communicatively coupled to the one or more processors and storing instructions that when executed by at least some of the one or more processors cause operations comprising:
obtaining a directed acyclic graph describing a plurality network connections between a plurality of downstream nodes forming a multi-path route to an Internet connected transceiver;
determining an encoding kernel specifying transformations to be performed by the plurality of downstream nodes on data received from upstream nodes, wherein:
the encoding kernel corresponds to a multi-hop, multi-path route through the directed acyclic graph,
the transformations including a combination of two or more inputs to a downstream node to be transmitted as output, and
the data contains redundant information to be used for error detection or error correction to be received at a downstream node;
transmitting at least part of the encoding kernel to at least some of the downstream nodes, wherein the encoding kernel specifies a respective scalar value for each of a plurality of adjacent pairs of paths in the multi-path route; and
transmitting data from a data source to a downstream node in the directed acyclic graph specified by the encoding kernel such that the data is conveyed through the multi-hop, multi-path route to the Internet connected transceiver.

2. The node of claim 1, comprising a site master controller configured to monitor or control a respective one of the following: an oil well, a petro water disposal or re-injection facility, or a petroleum pumping stations via the transmitted data.

3. The node of claim 1, wherein the plurality of connections are wireless connections, the Internet connected transceiver is an Internet connected wireless transceiver, and the operations comprise:
determining a transmit frequency; and
adjusting the radio to transmit at the determined transmit frequency.

4. The node of claim 3, wherein determining a transmit frequency comprises:
obtaining a geolocation from which transmitting data is to occur;
querying a remote whitespace database with the geolocation to obtain available frequencies; and
selecting a transmit frequency from among the available frequencies responsive to the query.

5. The node of claim 3, wherein determining a transmit frequency comprises:
attempting to transmit at a first frequency;
determining that an acknowledgement signal (ACK) responsive to the transmission at the first frequency has not been received within a duration of time; and
attempting to transmit at a second frequency, the second frequency being lower in frequency than the first frequency.

6. The node of claim 5, wherein the first frequency and the second frequency are selected from among a plurality of frequencies responsive to a query to a remote whitespace database.

7. The node of claim 1, wherein the plurality of connections are wireless connections, the Internet connected transceiver is an Internet connected wireless transceiver, and the operations comprise:
selecting a pseudo random code to perform code division multiple access channel coding; and
encoding the data from the data source with the pseudo random code to transmit the data from the data source, wherein transmission is spread among multiple frequencies.

8. The node of claim 7, wherein selecting a pseudo random code comprises:
dynamically adjusting a code ratio with which the data from the data source is encoded based on channel state.

9. The node of claim 1, wherein the one or more processors comprise:
a field programmable gate array (FPGA); and
an application specific integrated circuit (ASIC) central processing unit, wherein the operations comprise:
dynamically re-allocating communications protocol tasks from the FPGA to the CPU.

10. The node of claim 1, the operations comprising:
steps for forming a network.

11. The node of claim 1, the operations comprising:
steps for route selection.

12. The node of claim 1, the operations comprising:
steps for deriving a network code.

13. The node of claim 1, the operations comprising:
steps for medium access control.

14. A method, comprising:
obtaining a directed acyclic graph describing a plurality of connections between a plurality of downstream nodes forming a multi-path route to an Internet connected transceiver;
determining an encoding kernel specifying transformations to be performed by the plurality of downstream nodes on data received from upstream nodes, wherein:
the encoding kernel corresponds to a multi-hop, multi-path route through the directed acyclic graph,
the transformations including a combination of two or more inputs to a downstream node to be transmitted as output, and
the data includes redundant information to be used for error detection or error correction to be received at a downstream node, wherein the encoding kernel specifies a respective scalar value for each of a plurality of adjacent pairs of paths in the multi-path route;
transmitting at least part of the encoding kernel to at least some of the downstream nodes; and
transmitting data from a data source to a downstream node in the directed acyclic graph specified by the encoding kernel such that the data is conveyed through the multi-hop, multi-path route to the Internet connected transceiver.

15. The node of claim 1, the operations comprising:
steps for determining transmission power.

16. A method, comprising:
obtaining a directed acyclic graph describing a plurality connections between a plurality of downstream nodes forming a multi-path route to an Internet connected transceiver;
determining an encoding kernel specifying transformations to be performed by the plurality of downstream nodes on data received from upstream nodes, wherein:
the encoding kernel corresponds to a multi-hop, multi-path route through the directed acyclic graph,
the transformations including a combination of two or more inputs to a downstream node to be transmitted as output, and
the data includes redundant information to be used for error detection or error correction to be received at a downstream node, wherein the encoding kernel specifies a respective scalar value for each of a plurality of adjacent pairs of paths in the multi-path route;
transmitting at least part of the encoding kernel to at least some of the downstream nodes; and
transmitting data from a data source to a downstream node in the directed acyclic graph specified by the encoding kernel such that the data is conveyed through the multi-hop, multi-path route to the Internet connected wireless transceiver.

17. The method of claim 16, comprising sharing a power supply with a respective one of the following: an oil well, a petro water disposal or re-injection facility, or a petroleum pumping stations.

18. The method of claim 16, wherein the plurality of connections are wireless connections and the Internet connected transceiver is an Internet connected wireless transceiver, the method further comprising:
determining a transmit frequency; and
adjusting a radio to transmit at the determined transmit frequency.

19. The method of claim 18, wherein determining a transmit frequency comprises:
obtaining a geolocation from which transmitting data is to occur;

querying a remote whitespace database with the geolocation to obtain available frequencies; and selecting a transmit frequency from among the available frequencies responsive to the query.

20. The method of claim 18, wherein determining a transmit frequency comprises:

attempting to transmit at a first frequency;

determining that an acknowledgement signal (ACK) responsive to the transmission at the first frequency has not been received within a duration of time; and attempting to transmit at a second frequency, the second frequency being lower in frequency than the first frequency.

21. The method of claim 20, wherein the first frequency and the second frequency are selected from among a plurality of frequencies responsive to a query to a remote whitespace database.

22. The method of claim 16, wherein the plurality of connections are wireless connections and the Internet connected transceiver is an Internet connected wireless transceiver, the method further comprising:

selecting a pseudo random code to perform code division multiple access channel coding; and encoding the data from the data source with the pseudo random code to transmit the data from the data source, wherein transmission is spread among multiple frequencies.

23. The method of claim 22, wherein selecting a pseudo random code comprises:

dynamically adjusting a code ratio with which the data from the data source is encoded based on channel state.

24. The method of claim 16, comprising:

dynamically re-allocating signal processing tasks from a field programmable gate array (FPGA) to an application specific integrated circuit (ASIC) central processing unit.

25. The method of claim 16, comprising:

sensing a parameter of an oil well, the parameter being at least part of the data from a data source transmitted to a downstream node.

26. The method of claim 16, comprising:

receiving a request for a website from a consumer wireless modem, the request for a website being at least part of the data from a data source transmitted to a downstream node.

* * * * *